United States Patent [19]

Diederich et al.

[11] Patent Number: 5,507,585
[45] Date of Patent: Apr. 16, 1996

[54] WINDSHIELD WIPER PIVOT MOUNTING

[75] Inventors: James N. Diederich, Kettering, Ohio; Ralph W. Edwards, Shelby; Terry J. Powers, Brighton, both of Mich.

[73] Assignee: ITT Automotive Electrical Systems Inc., Auburn Hills, Mich.

[21] Appl. No.: 88,063

[22] Filed: Jul. 6, 1993

[51] Int. Cl.⁶ .................................................. F16B 21/02
[52] U.S. Cl. .......................... 403/349; 403/13; 403/197; 15/250.3
[58] Field of Search .............................. 403/13, 14, 348, 403/349, 71, 117, 197, 199; 15/250.3, 250.31, 250.27

[56] References Cited

U.S. PATENT DOCUMENTS

| | | | |
|---|---|---|---|
| 3,016,558 | 1/1962 | Deibel | 15/250.27 |
| 3,135,982 | 6/1964 | Carlisle | 15/250.3 |
| 4,509,878 | 4/1985 | Bryson et al. | 403/71 |
| 5,035,398 | 7/1991 | Chiang | 403/348 |
| 5,067,198 | 11/1991 | Ishikawa et al. | 15/250.31 |

Primary Examiner—Richard A. Bertsch
Assistant Examiner—William Wicker
Attorney, Agent, or Firm—Dykema Gossett

[57] ABSTRACT

A mounting for a windshield wiper pivot shaft on a vehicle body panel supports the shaft for rotation about an axis of the panel. The mounting includes a transmission housing adapted to be rotatably seated on a first side of the panel. A key on the transmission housing and an associated keyway in the panel limits housing rotation in a first direction to a mounting position wherein an axis of the housing is aligned with the axis of the panel. The key has a retention surface which engages the panel to limit axial movement between the housing and the panel when the housing is in the mounting position, thereby passively retaining the housing to the panel. In one embodiment, a plurality of screws are installed from a second side of the panel opposite the first side and threadingly engage the housing. The screws are tightened in the first direction to rigidly fix the transmission housing to the panel, thereby maintaining the housing in the mounting position.

7 Claims, 2 Drawing Sheets

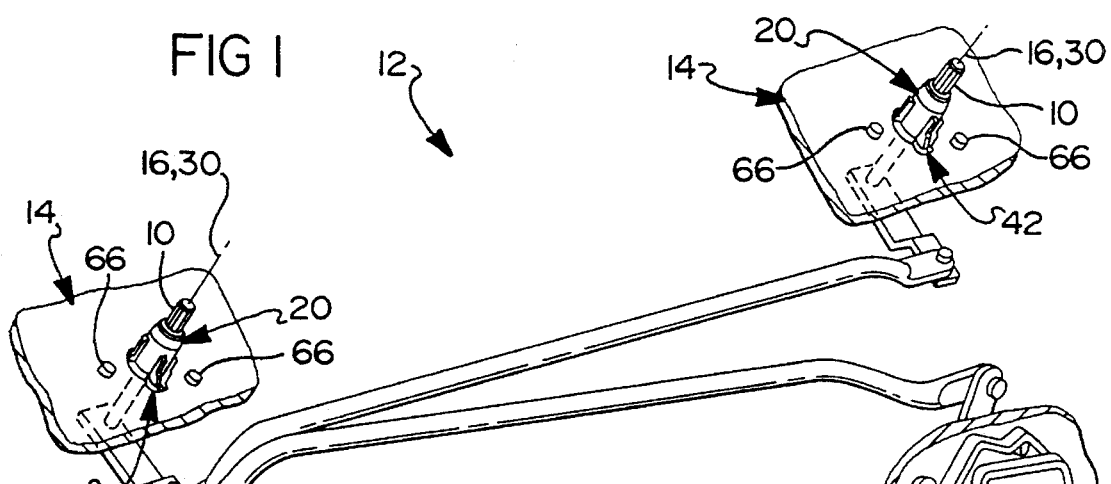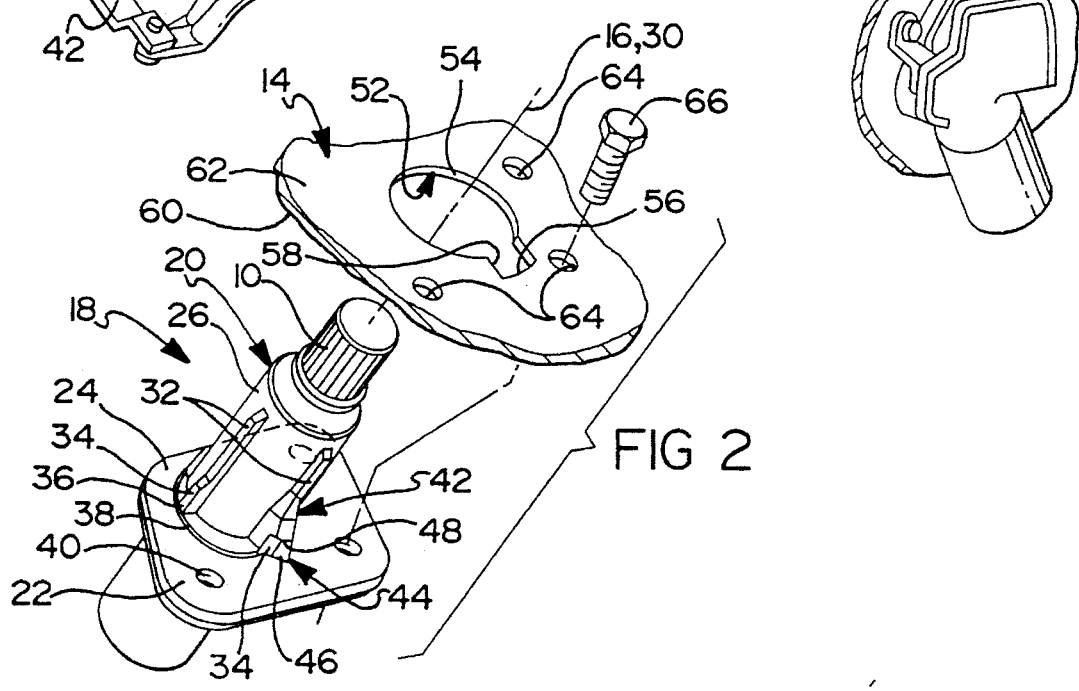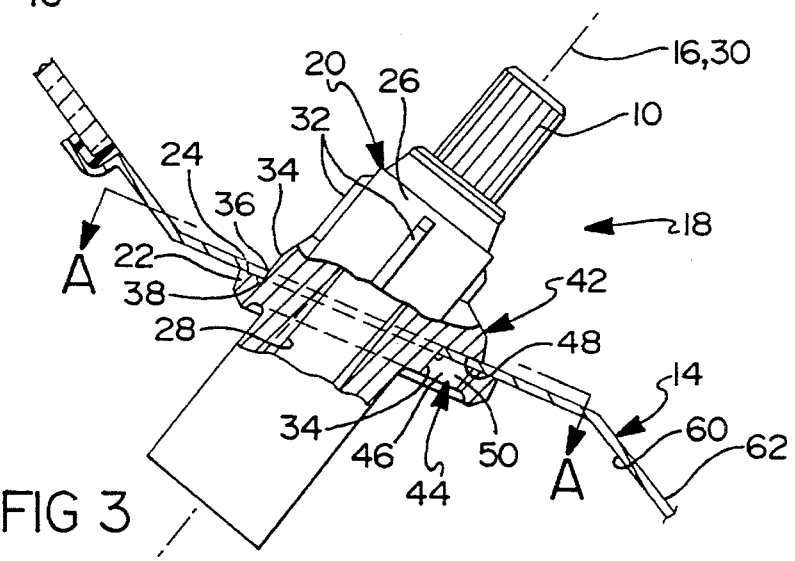

5,507,585

WINDSHIELD WIPER PIVOT MOUNTING

TECHNICAL FIELD

This invention relates to windshield wiper systems for automotive vehicles and, more particularly, to a windshield wiper pivot mounting.

BACKGROUND OF THE INVENTION

In typical automotive windshield wiper systems, individual wiper arms are attached to corresponding pivot shafts rotatably supported on transmission housings mounted on a body panel below the windshield. Motive force is supplied by a drive link to one pivot shaft and movement of the wiper arms is synchronized by a cross link between the pivot shafts. Typically, the transmission housings have a plurality of apertures which are aligned with corresponding apertures in the body panel and are fastened thereto with a plurality of threaded fasteners in a manual assembly operation.

This installation is difficult to execute in that it requires an assembler to simultaneously press the housing upward against a first side of the body panel, align the apertures, and screw in the threaded fasteners from a second side of the body panel.

A windshield wiper transmission housing according to this invention represents an improvement over previous windshield wiper transmissions housings in that the transmission housing can be positively positioned and passively retained in the body panel thereby facilitating installation of the fasteners.

SUMMARY OF THE INVENTION

A mounting for a windshield wiper pivot shaft on a vehicle body panel supports the shaft for rotation about an axis of the panel. The mounting includes a transmission housing adapted to be rotatably seated on a first side of the panel. A key on the transmission housing and a keyway in the panel cooperate to limit housing rotation in a first direction to a mounting position wherein three fastener apertures in the housing are aligned with three fastener apertures in the panel. The key also limits axial movement of the housing relative to the panel when the housing is in the mounting position thereby passively retaining the housing to the panel. A plurality of screws are installed from a second side of the panel opposite the first side to rigidly fix the transmission housing to the panel in the mounting position.

This invention greatly facilitates the installation and mounting of a windshield wiper transmission housing on a vehicle body panel. An assembler is able to blindly insert the transmission housing into the body panel and align apertures in the housing with apertures in the body panel without seeing them. Threaded fasteners, such as screws, can be passed through the panel apertures and into the housing and then tightened to rigidly fix the housing to the body panel. A great deal of time is saved by this invention which eliminates the fumbling associated with a blind assembly.

DESCRIPTION OF THE DRAWINGS

FIG. 1 is a perspective view of a windshield wiper system.

FIG. 2 is an exploded view of a windshield wiper pivot mounting.

FIG. 3 is a side view of a windshield wiper pivot mounting partially sectioned at a body panel.

DESCRIPTION OF THE PREFERRED EMBODIMENT

Figure 4:
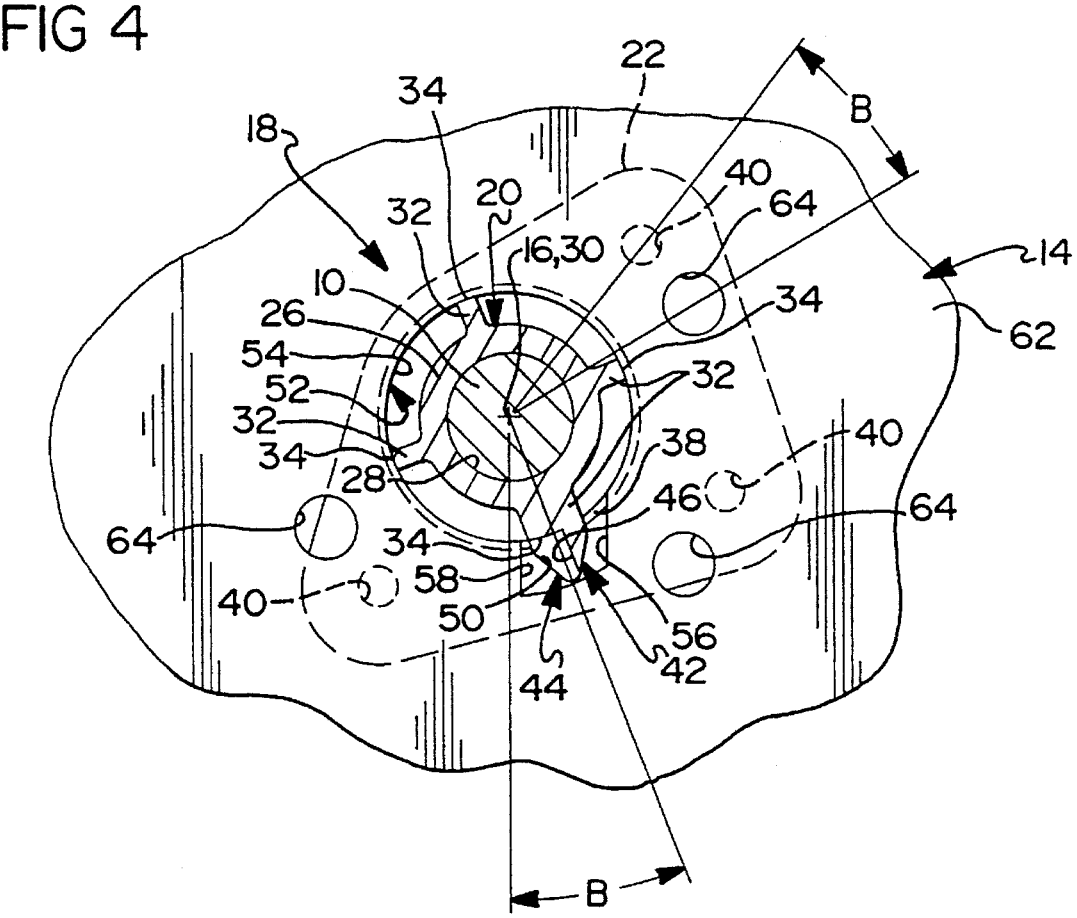
FIG. 4 is a view of the mounting of FIG. 3 in the direction of Arrows A—A with a housing key aligned with a keyway in the panel.

A windshield wiper pivot shaft 10 of a windshield wiper system 12 is supported on a vehicle body panel 14 for rotation about an axis 16 of the panel 14 by a mounting 18 according to this invention. The mounting 18 includes a transmission housing 20 having a base 22 defining a base surface 24 adapted to seat against the panel 14 and a tower 26 projecting from the base surface 24. A pivot shaft support bore 28 passes through the tower 26 on an axis 30 of the housing 20.

Figure 5:
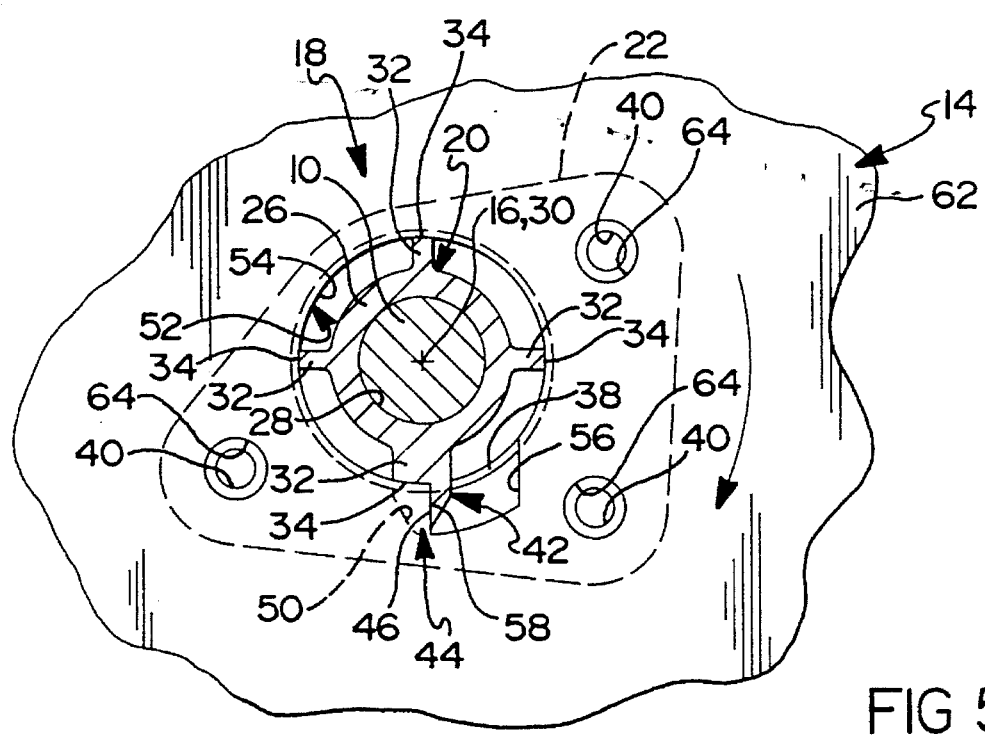
FIG. 5 is a view of the mounting of FIG. 3 in the direction of Arrows A—A in a mounting position with respect to the panel.

Four locating ribs 32, evenly spaced from each other and parallel with the housing axis 30, radiate out from the tower 26 and increase in radius toward the base surface 24. The housing 20 also has a first pilot surface 34 defined by a circle connecting a bottom edge 36 of each of the locating ribs 32 at the base surface 24. An undercut 38 circumscribing the ribs 32, as shown in FIGS. 4 and 5, is coincident with the connecting circle. Three fastener apertures or holes 40, through the base 22 are distributed about the tower 26.

A key 42 is integrated into one of the four ribs 32. The key 42 is wider than the ribs 32 and extends radially beyond the first pilot surface 34. The key 42 has a notch 44 at the base surface 24 defining an indexing surface 46 normal to the base surface 24 and approximately parallel to the axis 30 of the housing 20.

The notch 44 further defines a retention surface 48 opposite the base surface 24 and separated from the base surface 24 by approximately the thickness of the panel 14. The notch 44 also defines the portion of the first pilot surface 34 associated with the key 42. The first pilot surface 34 in the notch 44 extends away from the indexing surface 46 of the key 42 in the clockwise direction to a side of the key, as shown in FIGS. 4 and 5.

An opening 50 in the base 22 beneath the retention surface 48 is produced in the molding of the housing 20 by an extension of a lower die (not shown) extending upward beyond the base surface 24 which forms the notch 44 in the key 42.

The panel 14 has an aperture 52 providing both a second pilot surface 54 for rotatably receiving the first pilot surface 34 and a keyway 56 intersecting the second pilot surface 54 for receiving the key 42. The keyway 56 is approximately the same width as the key 42 and has an abutment surface 58 for contact with the indexing surface 46 of the key 42.

The panel 14 has a first side 60 disposed in a downward direction and an opposite second side 62 disposed in an upward direction. The panel 14 also has three fastener apertures or holes 64, corresponding to the fastener holes 40 in the transmission housing 20 through which three fasteners or self-threading screws 66, pass when the housing 20 is attached to the panel 14 as described below.

The housing 20 is assembled to the panel 14 as follows. An assembler, holding the housing 20 in one hand, positions the housing below the aperture 52 in the panel 14 and inserts the tower 26 of the housing 20 upward into the aperture 52. The housing 20 is rotatively indexed by the assembler, aligning the key 42 with the keyway 56. Insertion is then continued with the ribs 32 progressively aligning the first pilot surface 34 with the second pilot surface 54 until the base surface 24 is seated against the first side 60 of the panel 14 with the first pilot surface 34 disposed within the second pilot surface 54. In that circumstance, an angular interval B between the indexing surface 46 of the notch 44 and the abutment surface 58 on the panel 14 equals an angular interval B between the fastener holes 40 in the base 22 and the fastener holes 64 in the panel 14.

The assembler then rotates the transmission housing 20 in a clockwise direction, as shown in FIG. 5, through the angular interval B to a mounting position defined by contact between the indexing surface 46 and the abutment surface 58. In the mounting position shown in FIG. 5, the fastener holes 40 in the housing 20 are aligned with the fastener holes 64 in the panel 14, and the retention surface 48 is disposed over the panel 14 to passively retain the transmission housing 20 in the aperture 52. The transmission housing 20 is released by the assembler, freeing both the assembler's hands for installing screws.

The assembler passes one screw 66 through each of the panel's fastener holes 64 from the second side 62 of the panel 14, threading them into the holes 40 in the base 22 of the housing 20 to rigidly fix the transmission housing 20 to the panel 14. The screws 66 have a right hand thread and transmit the clockwise tightening torque to the housing 20, forcing its indexing surface 46 against the abutment surface 58, thereby maintaining the housing 20 in the mounting position.

The embodiments of the invention in which an exclusive property or privilege is claimed are defined as follows:

1. In a mounting for a windshield wiper pivot shaft on a vehicle body panel for rotation about an axis of the panel, the combination comprising:

a transmission housing adapted to be rotatably seated on a first side of the panel for limited rotation in a first direction to a mounting position and having
a base defining a base surface adapted to seat against the panel,
a tower projecting from the base surface,
means defining a pivot shaft support bore through the tower on the axis of the housing,
means defining a first pilot surface proximate to the base surface and
a key projecting from at least one of the base surface and the tower and proximate to both and having means defining
an indexing surface radiating beyond the first pilot surface normal to the base surface and approximately parallel to the axis of the housing and
a retention surface opposite the base surface adapted for disposition over the panel when the transmission housing is in the mounting position thereby limiting axial movement between the transmission housing and the panel,
means on the panel defining an aperture having
a second pilot surface adapted to rotatably receive the first pilot surface and
a keyway intersecting the second pilot surface adapted to receive the key and having means defining an abutment surface adapted to stop rotation of the transmission housing in the first direction beyond the mounting position by contact with the index surface, and
a plurality of fastener means adapted to rigidly fix the transmission housing base to the panel in the mounting position distributed about the tower and to be installed from a second side of the panel opposite the first side.

2. A combination as claimed in claim 1, further characterized by the fastener means being threaded fasteners with associated fastener apertures in the housing and in the panel being aligned in the mounting position and the threaded fasteners being configured for tightening in the first direction of rotation the tightening of which forces the indexing surface against the abutment surface.

3. A combination as claimed in claim 2 further characterized by the key and the keyway being of approximately identical width and the key having notch means at the base surface defining the indexing surface and the retention surface.

4. A combination as claimed in claim 2, further comprising a plurality of locating ribs parallel with the housing axis radiating out from the tower adapted to progressively align the first pilot surface with the second pilot surface as the tower of the housing is inserted into the aperture with the key being integrated into one of the locating ribs.

5. A combination as claimed in claim 4, further characterized by a bottom edge of each of the locating ribs providing the means defining a first pilot surface.

6. A combination as claimed in claim 5, further characterized by the bottom edge of the rib into which the key is integrated being adapted to extend across the key from the indexing surface toward the abutment surface of the panel.

7. A combination as claimed in claim 5 further characterized by the key and the keyway being of approximately identical width and the key having notch means at the base surface defining the indexing surface, the retention surface, and the bottom edge.

* * * * *